United States Patent [19]

Garnham

[11] Patent Number: 5,035,258
[45] Date of Patent: Jul. 30, 1991

[54] VALVE WITH REMOVABLE INSERT

[75] Inventor: David Garnham, Rothwell, England

[73] Assignee: Cooper Industries, Inc., Houston, Tex.

[21] Appl. No.: 555,055

[22] Filed: Jul. 19, 1990

[30] Foreign Application Priority Data

Nov. 8, 1989 [EP] European Pat. Off. ........ 89311556.8

[51] Int. Cl.5 ............................................. F16K 27/04
[52] U.S. Cl. .................................... 137/454.2; 137/315
[58] Field of Search ............... 137/454.2, 454.6, 454.5; 251/203, 201, 195

[56] References Cited

U.S. PATENT DOCUMENTS

| | | | |
|---|---|---|---|
| 1,181,157 | 5/1916 | O'Brien | 251/201 X |
| 3,179,121 | 4/1965 | Bredtschneider et al. | 137/454.6 |
| 3,202,175 | 8/1965 | Dumm | 137/454.2 |
| 3,589,674 | 6/1971 | Jones | 251/151 |
| 3,799,191 | 3/1974 | Burkhardt et al. | 137/454.2 |
| 4,387,735 | 6/1983 | Ripert | 137/315 |
| 4,431,022 | 2/1984 | Ripert | 137/315 |
| 4,874,008 | 10/1989 | Lawson | 137/315 |

Primary Examiner—Stephen M. Hepperle
Attorney, Agent, or Firm—Jackie Lee Duke; Nelson A. Blish; Alan R. Thiele

[57] ABSTRACT

A valve assembly has a body portion (11) which can be removably receivable in a receptacle (10). The body carries the valve element such as a gate which controls fluid through a flowpath in the body. The openings of a flowpath in the receptacle accommodate annular sealing members (23, 24) which are movable axially in the opening. Means such as a lever arrangement (32, 33) are coupled to each sealing members and are contactable by the body (11) on its insertion in the receptacle such that the sealing members are moved axially toward the body to seal around the flowpath openings of the body.

14 Claims, 3 Drawing Sheets

VALVE WITH REMOVABLE INSERT

BACKGROUND

This invention relates to valve assemblies. It has particular application to valves which are used typically in relatively inaccessible locations, e.g. valves of the type which are used in subsea pipelines.

The components of valves, e.g. gate valves which are used in subsea locations are subject to wear, corrosion, and erosion and hence periodically need replacement. It has been proposed to mount the flow control components of such valves, typically the gates and seats, in an insert which can be removably mounted in a receiver receptacle. The receptacle can be coupled to the flow line which the valve controls. This enables the insert to be removed either by a diver or a remotely operated vehicle for the replacement of the valve components. In such arrangements it is necessary to provide a metal seal between the insert and the receiver. In a known arrangement the receiver is provided with tapering faces against which the surface of the insert can seal. The receiver of this arrangement is very complex to produce, the most common method being by casting. However, even when cast the machining is still very complex and it is an expensive process.

The K. B. Bredtschneider et al. U.S. Pat. No. 3,179,121 discloses a ball valve construction with a ball and seats manually removable as a unit. The seats seal against the valve body with elastomeric seal means on a tapered surface.

The M. R. Jones U.S. Pat. No. 3,589,674 discloses another ball valve structure with a second pressure balancing stem in which the the ball, seats and balance stems are manually removable as a unit.

The J. A. Burkhardt et al. U.S. Pat. No. 3,799,191 discloses a gate valve structure with a removable body containing the gate, seats, stem and stem operating means. The removable body is secured to the valve body by a lock ring.

The R. L. Ripert U.S. Pat. No. 4,387,735 discloses a valve structure removable from a pipeline wherein the valve is received within a support structure attached to the pipeline. The support structure has seal rings mounted therein which a worm gear mechanism activates into engagement with the removable valve structure to form a fluid tight conduit.

The R. L. Ripert U.S. Pat. No. 4,431,022 discloses a removable valve structure received within a support structure similar to that of the '735 patent. The valve structure has all components mounted therein, including a sealing means on each end of the valve which is biased outwardly to engage parallel plates on the support structure. A pressure responsive means for moving the seal rings inwardly during installation and removal is also disclosed.

The J. E. Lawson U.S. Pat. No. 4,874,008 discloses a valve mounting structure whereby hydraulic studs are used to secure a valve body between mounting members which are part of a block manifold used in oil and gas production.

SUMMARY

According to the present invention there is provided a valve arrangement comprising a body portion removably receivable in a receptacle portion, the body portion including valve elements for controlling fluid flow through a flowpath in the body portion, and the receptacle portion including flowpaths which, when the body portion is received in the receptacle portion, communicate with the flowpath in the body portion, annular sealing members disposed in the opening of each receptacle flowpath, each sealing member being movable axially in its opening, and means coupled to said sealing member, and engagable by said body portion when it is inserted into said receptacle portion to urge said sealing members into sealing engagement with the surface of the body portion.

The means engageable by the body portion may comprise a lever assembly coupled to each sealing member. Each lever assembly may have a bifurcated portion which is coupled to its sealing member at diametrically opposite positions. Each lever may exhibit a degree of resilience whereby it acts like a spring to maintain sealing contact between the body portion and the sealing members. The body portion may carry sealing means for sealing against said sealing members. The sealing means may comprise annular metal-to-metal seals each of which are located in an annular groove formed in the body portion.

The body portion may carry a locking ring adapted to engage a thread on the wall of the receptacle bore which receives the body portion, said locking ring being engagable by an appropriate tool which is operable to rotate the locking ring to cause the body portion to move axially relative to the receptacle.

Each lever may be shaped to define an elbow or heel which abuts the receptacle body and forms a pivot point about which the lever can pivot when a lower part of the body portion comes into contact with the lever. The forward part of the body portion may be tapered to define a ramp which engage each lever assembly.

An object of the present invention is to provide a valve arrangement of the insert type which can be produced by a less complex manufacturing method.

Another object is to provide an insert type valve which can be easily installed and removed from its mounting receptacle.

A further object is to provide an insert type valve which is particularly adaptable to use in relatively inaccessible locations such as subsea oil and gas wells.

BRIEF DESCRIPTION OF THE DRAWINGS

These and other objects and advantages of the present invention are set forth below and further made clear by reference to the drawings wherein.

DESCRIPTION OF THE PREFERRED EMBODIMENT

Figure 1:
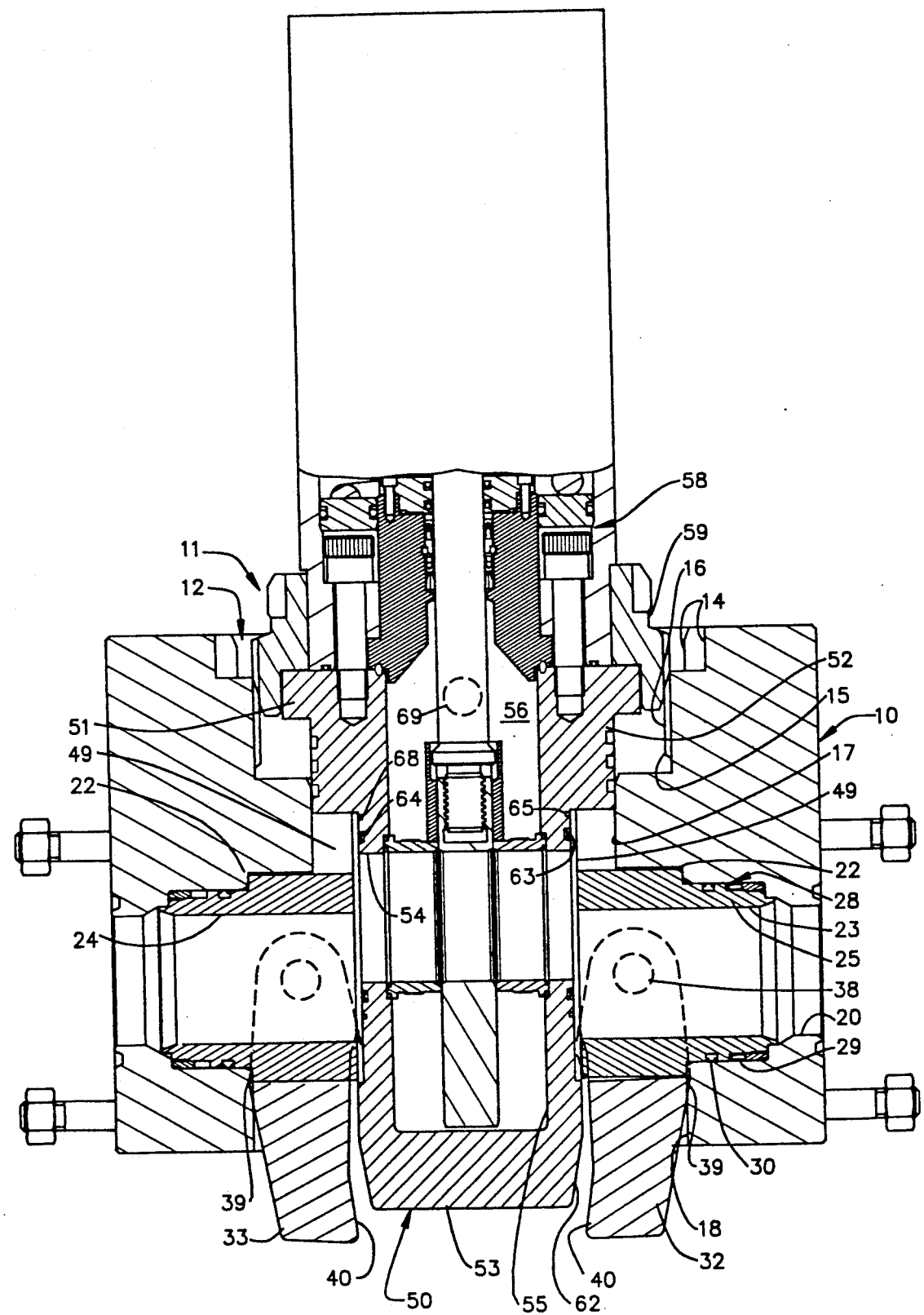
FIG. 1 is an elevation view, partly in section, of a valve assembly in accordance with the present invention, the valve being shown in a position prior to its final assembly position.

Referring to the drawings, a valve assembly comprises a receptacle 10 which can receive a valve insert assembly 11. The receptacle 10 comprises a metallic block formed with a first through bore 12 into which the insert 11 is designed to locate. The bore 12 has a first bore portion 14, a second bore portion 15 which is formed with internal threads 16, a third through bore portion 17 and a slotted portion 18. A second bore 20 extends through the receptacle 10 perpendicular to the first bore 12. The second bore 20 opens into the fourth portion 18 of the first bore 12. The oppositely facing portions of the second bore 20 which open into the bore 12 have stepped wall portions 22. The second bore 20 constitutes a flow path for fluid such as oil flowing in a subsea flow line. Typically the receptacle 10 will be connected to such a flow line.

Each stepped portion 22 of the bore 20 defines a pocket which receives a tubular sealing member or subs 23, 24. The outer wall of each sealing sub 23, 24 is stepped in a manner corresponding to that of the wall pocket 22. The thinner wall part 25 of each sealing sub carries a sealing arrangement shown generally at 28. This comprises a metal seal ring 29 for providing a metal-to-metal seal between each sealing sub 23, 24 and its pocket wall, together with a secondary elastomeric seal shown at 30. Each sealing sub 23, 24 is mounted so that it can move axially within its respective pocket 22.

Figure 3:
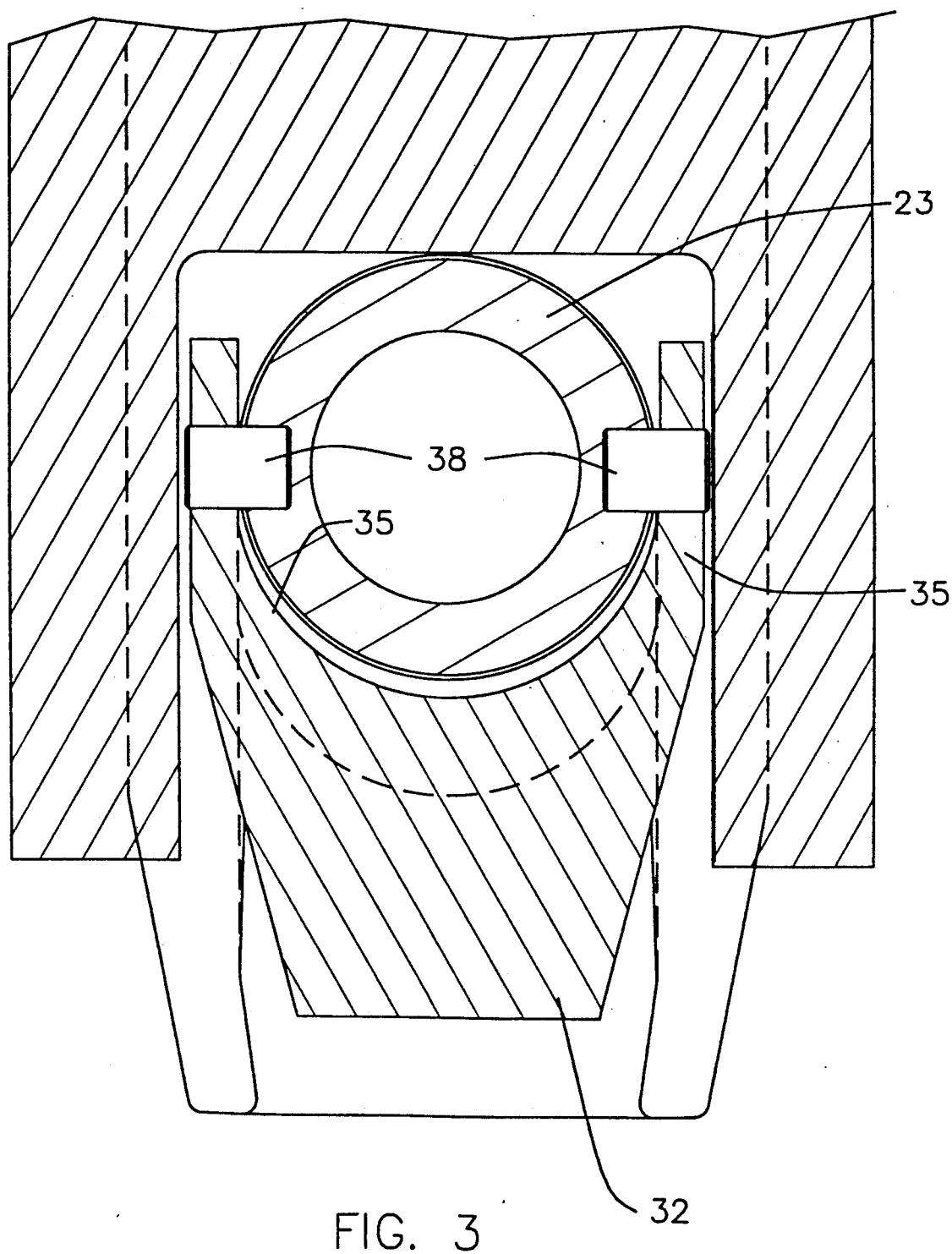
FIG. 3 is an enlarged sectional view on the line 3—3 of FIG. 2.

Each sealing sub 23, 24 is coupled to a thrust lever 32, 33 which depends from its associates sealing sub. Each thrust lever has a bifurcated upper portion 35 (see FIG. 3) having a semicircular wall 36 which fits closely at both sides with clearance around the circumferential part of the respective sealing sub 23, 24. The opposite limbs constituting the bifurcated portions are hinged to each sealing sub by pins 38. Each lever has a heel portion 39 disposed against the wall of the bore portion 18 and an inwardly slanting lower portion 40. Each lever is formed from a material which has a certain degree of inherent resilience.

The insert assembly 11 has a body portion 50 which is generally cylindrical and has an upper flanged part 51 which is arranged to locate in the bore portion 14, an intermediate part 52 which is arranged to locate in the bore portion 17 and a lower portion 53. The lower portion 53 has axially extending, diametrically opposite slots 49 which receive the projecting end portions of the sealing subs 23, 24. The lower portion 53 has a diametrically extending through bore 54 which provides a flow path for fluid. In the completed valve assembly this bore portion is designed to be in alignment with the bore 20 of the receptacle. An axially extending closed bore 55 extends into the body portion 50 and accommodates the components of a gate valve shown generally at 56. These components are generally conventional components of a gate valve and will not be described in detail since their construction and operation will be apparent to the man skilled in the art. The upper part 51 of the housing 50 is connected to an actuating assembly 58 for the gate valve assembly 56. A locking ring 59 is mounted around the lower part of the actuating arrangement 58 and the upper body part 51. The upper circumferential part of the locking ring 59 is castellated and the lower outer periphery of the locking ring has threads which can engage the threads 16 on the bore portion 15. The lowermost part of the housing 50 is formed with a tapering wall 62.

The wall of the housing 50 around opposite ends of its through bore 54 is formed with annular grooves 63. Each annular groove 63 accommodates a pressure energized metal-to-metal annular seal 64. A further annular groove 65 extends concentrically around the annular groove 63 and accommodates a secondary elastomer O-ring seal 68.

In use in order to locate the insert 11 in the receptacle 10 the insert is lowered so that is moves into the bore 12 of the receptacle. The tapering portion 62 on the lower end of the insert acts as a lead-in chamfer for this movement. The insert 11 is orientated angularly relative to the receptacle by means of a pin (shown by dotted line 69) which projects radially inwardly from the wall of the bore 12 and engages an axially extending slot formed in the housing 50 of the insert. As shown in FIG. 1 the diametrically opposed slots 49 formed on the lower housing portion 53 allow the insert 11 to pass between the two sealing subs 23 and 24. The pin 69 and groove arrangement just referred to also assist in preventing the nose 62 of the insert from coming into contact and damaging the sealing subs.

Figure 2:
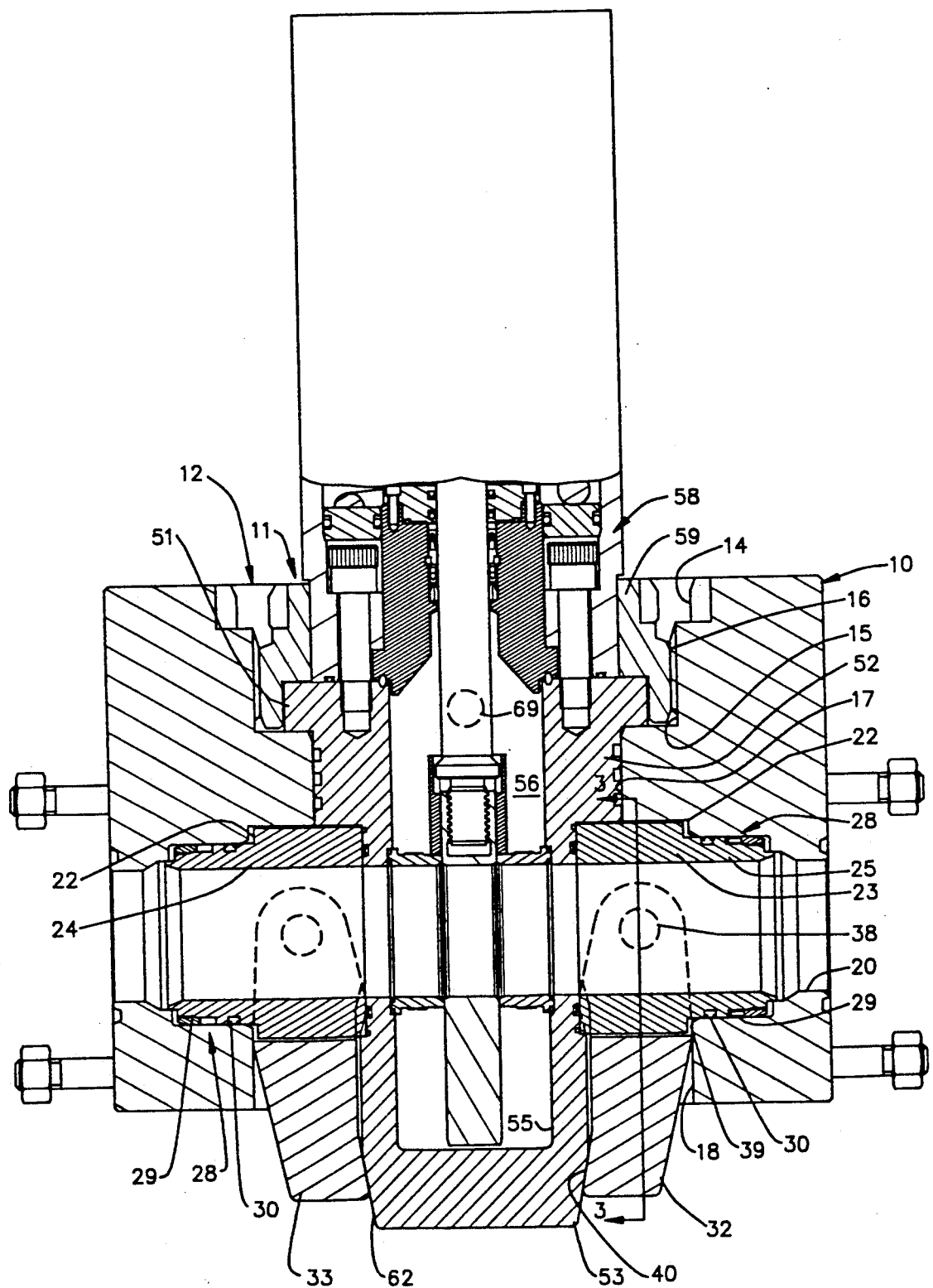
FIG. 2 is a view similar to that of FIG. 1 showing the components in their assembled position.

The insert is lowered until the locking ring 59 comes into contact with the threads 16 formed on the bore portion 15. This position is illustrated in FIG. 1 of the drawings. It will be noted that at this stage there is clearance between the axially inner end faces of the sealing subs 23, 24 and the outer peripheral wall of the housing 50 and also between the lower portion 62 of the housing 50 and the levers 32 and 33. In order to move the insert further into the receptacle the locking ring 59 is rotated relative to the receptacle. The castellation on the locking ring enable it to be engaged by an appropriate remotely operated tool. Slots can be provided in the top face of the receptacle body to provide reaction points for such a tool. Initially the locking ring 59 is rotated approximately two revolutions in a clockwise sense to advance the insert to a point at which contact is established between the lower outer part 62 of the housing 50 and the levers 32, 33. Continued rotation of the locking ring advances the insert assembly 11 axially into the bore 12 and the ramp provided by the tapered portion 62 urges the levers about their heels 39, hence causing the sealing subs 23, 24 to move axially in their pockets 22 towards the wall of the body portion 50. When the insert has been advanced to its fully inserted position shown in FIG. 2 the sealing subs 23 and 24 have been urged by the interaction of the housing 50 with the levers 32 into close engagement with the wall around the bore 54 through the housing 50. This junction is sealed by the metal-to-metal seals 64 carried by the housing portion 50.

The thrust levers 32, 33 are hinged to the sealing subs 23, 24 in such a way as to provide an appropriate mechanical advantage. It will be seen that the sealing subs 23 and 24 are sealed in their pockets by the sealing assemblies 28, primarily the metal-to-metal seal 29. The secondary seal 30 is a back up seal which serves to protect the metal sealing surface from being exposed to sea water. A sleeve arrangement can be provided on each sealing sub to protect the area between it and the body from any build up of sediment or debris which might otherwise prevent removal of the insert when that is required. When the components are in their operative positions and the valve is open pressure acting behind the sealing subs 23, 24 operates to maintain them in contact with the body 50 hence preventing seal fretting and ingress of debris. Also when the valve is close the pressure acts on the upstream sealing sub.

Each thrust lever 32, 33 is designed to provide a minimum thrust load and to accommodate a tolerance variation of relative components of the order of 0.020 inches within deflection of the lever arm so as to ensure face-to-face make up at the interface of the seal 64. It should be noted that the seals 28 on the sealing subs 23, 24 will be a larger size than the seal 64 to thereby provide a pressure bias which maintains face-to-face contact under all conditions and prevents seal fretting due to cyclic loading.

The resilience of the levers 32, 33 ensures that they act like springs to maintain the sealing contact between the sealing subs 23, 24 and the seals 64 carried by the insert body 50.

It will be appreciated that removal of the insert assembly 11 is substantially the reverse of the installation procedure described above. Initially an over torque is applied to the locking ring 59 by applying a counter clockwise rotation to the ring and once this is overcome the necessary torque reduces significantly since the springback of each metal seal 64 is typically 0.002 inches. As rotation continues (after approximately six revolutions of the locking ring) shoulders machined on the insert body coincide with similar shoulders machined on the thrust levers causing the sealing subs to retract back into their respective pockets ready for reinstallation. The insert can then be retrieved for replacement of those valve components which need renewing.

The present arrangement has the advantage that it is more simple and more economic to produce than the known prior art devices. The sealing subs 23, 24 are urged permanently into contact with the body 50 of the insert and a metal-to-metal seal is provided between those two members. The sealing subs 23 and 24 are mounted in their respective pockets 22 such that they can be retrieved as well. The annular seals 68 around the seals 64 enable a test facility to be provided to test the insert body connection. The arrangement can be accurately machined to provide full bore alignment between the receptacle and the insert and the arrangement of levers gives the mechanical advantage which results in a reduced operating torque.

What is claimed is:

1. A valve arrangement, comprising:
    a body portion removably receivable in a receptacle portion,
    the body portion including valve elements for controlling fluid flow through a flowpath in the body portion and the receptacle portion including flowpaths which, when the body portion is received in the receptacle portion, communicate with the flowpath in the body portion,
    annular sealing members disposed in the opening of each receptacle flowpath, each sealing member being movable axially in its opening, and
    means coupled to said sealing member, and engagable by said body portion when it is inserted into said receptacle portion to urge said sealing members into sealing engagement with the surface of the body portion.

2. A valve arrangement according to claim 1, wherein the means engageable by the body portion comprise a lever assembly coupled to each sealing member.

3. A valve arrangement according to claim 2, wherein each lever assembly has a lever with a bifurcated portion which is coupled to its sealing member at diametrically opposite portions.

4. A valve arrangement according to claim 3, wherein each lever exhibits a degree of resilience whereby it acts like a spring to maintain sealing contact between the body portion and the sealing members.

5. A valve arrangement according to claim 1, wherein the body portion carries sealing means for sealing against said sealing members.

6. A valve arrangement according to claim 5, wherein the sealing means comprise annular, metal-to-metal seals each located in an annular groove formed in the body portion.

7. A valve arrangement according to claim 1, wherein
    the body portion carries a locking ring adapted to engage a thread on the wall of the receptacle bore which receives the body portion, and
    said locking ring being engagable by the appropriate tool which is operable to rotate the locking ring to cause the body portion to move axially relative to the receptacle.

8. A valve arrangement according to claim 4, wherein
    each lever is shaped to define a heel which abuts the receptacle body and forms a pivot point about which the lever can pivot when the lower part of the body portion comes into contact with the lever.

9. A valve arrangement according to claim 8, wherein
    the forward part of the body portion is tapered to define a ramp which engages each lever assembly.

10. An insert type valve, comprising:
    a receptacle portion with flowpaths disposed laterally therein,
    a body portion removably received with said receptacle portion,
    said body portion including valve elements for controlling fluid flow through a flowpath in the body portion and said body portion flowpath being in fluid communication with said receptacle portion flowpaths when said body portion is received within said receptacle portion,
    annular sealing members disposed in the opening of each receptacle flowpath, each sealing member being movable axially in its opening, and
    means coupled to said sealing member, and engagable by said body portion when it is inserted into said receptacle portion to urge said sealing members into sealing engagement with the surface of the body portion.

11. An insert type valve according to claim 10, wherein
    said means engageable by said body portion comprises a lever assembly with a lever having a bifurcated portion coupled to each sealing member at diametrically opposite portions, and
    said body portion carries sealing means for sealing against said sealing members.

12. An insert type valve according to claim 11, wherein
    said body portion carries a locking ring adapted to engage a thread on the wall of said receptacle bore which receives the body portion, and
    said locking ring being engagable by an appropriate tool which is operable to rotate the locking ring to cause the body portion to move axially relative to the receptacle.

13. An insert type valve according to claim 12, wherein
    said sealing means for sealing against said sealing members comprise annular, metal-to-metal seals each located in an annular groove formed in the body portion.

14. An insert type valve according to claim 13, wherein
    said lever is shaped to define a heel which abuts the receptacle body and forms a pivot point about which said lever can pivot when the lower part of said body portion comes into contact with said lever, and
    the forward part of said body portion is tapered to define a ramp which engages each lever assembly.

* * * * *